United States Patent
Vondran, Jr. et al.

(10) Patent No.: US 9,294,662 B2
(45) Date of Patent: Mar. 22, 2016

(54) DEPTH MAP GENERATION AND POST-CAPTURE FOCUSING

(71) Applicant: Broadcom Corporation, Irvine, CA (US)

(72) Inventors: Gary Lee Vondran, Jr., San Carlos, CA (US); Charles Dunlop Macfarlane, Cambs (GB)

(73) Assignee: Broadcom Corporation, Irvine, CA (US)

( * ) Notice: Subject to any disclaimer, the term of this patent is extended or adjusted under 35 U.S.C. 154(b) by 4 days.

(21) Appl. No.: 14/065,786

(22) Filed: Oct. 29, 2013

(65) Prior Publication Data
US 2015/0104074 A1    Apr. 16, 2015

Related U.S. Application Data

(60) Provisional application No. 61/891,631, filed on Oct. 16, 2013, provisional application No. 61/891,648, filed on Oct. 16, 2013.

(51) Int. Cl.
| | |
|---|---|
| G06K 9/00 | (2006.01) |
| H04N 5/225 | (2006.01) |
| H04N 5/235 | (2006.01) |
| G06T 5/00 | (2006.01) |
| G06T 5/50 | (2006.01) |

(Continued)

(52) U.S. Cl.
CPC .............. *H04N 5/2258* (2013.01); *G06T 5/002* (2013.01); *G06T 5/50* (2013.01); *G06T 7/002* (2013.01); *G06T 7/0067* (2013.01); *G06T 7/0069* (2013.01); *G06T 7/0085* (2013.01); *H04N 5/2355* (2013.01); *H04N 5/23229* (2013.01); *H04N 9/09* (2013.01); *H04N 13/025* (2013.01); *H04N 13/0246* (2013.01); *H04N 17/002* (2013.01); *G06T 2207/10004* (2013.01); *G06T 2207/10012* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 6,393,142 B1 * | 5/2002 | Swain et al. ................... | 382/154 |
| 2007/0024614 A1 * | 2/2007 | Tam et al. ...................... | 345/419 |

(Continued)

OTHER PUBLICATIONS

Silberman et al., "Indoor Scene Segmentation using a Structured Light Sensor," IEEE International Conference on Computer Vision Workshops Nov. 2011).

(Continued)

*Primary Examiner* — Weiwen Yang
(74) *Attorney, Agent, or Firm* — McDermott Will & Emery LLP

(57) ABSTRACT

Aspects of depth map generation and post capture focusing and re-focusing are described. According to one embodiment, a depth map is generated. The depth map may include a mapping among relative depth values in a field of view of an image based on a difference between pixels of a first image and pixels of a second image. An edge map may also be generated by identifying edges in at least one of the first image or the second image. Using the depth map and the edge map, the relative depth values in the depth map may be smoothed using the edge map. In this manner, certain discontinuities in depth values may be smoothed within edge-bounded regions defined by the edge map. The depth map may be used for focusing and re-focusing, for example, or for object extraction, scene understanding, or gesture recognition, among other imaging processes.

20 Claims, 13 Drawing Sheets

(51) Int. Cl.
*G06T 7/00* (2006.01)
*H04N 9/09* (2006.01)
*H04N 13/02* (2006.01)
*H04N 17/00* (2006.01)
*H04N 5/232* (2006.01)

(56) References Cited

U.S. PATENT DOCUMENTS

2012/0195492 A1* 8/2012 Ali et al. .................. 382/154
2013/0033582 A1* 2/2013 Sun et al. .................. 348/47
2013/0070050 A1* 3/2013 Ha et al. .................. 348/43

OTHER PUBLICATIONS

Scharstein et al., "A Taxonomy and Evaluation of Dense Two-Frame Stereo Correspondence Algorithms", International Journal of Computer Vision, Apr. 2002, vol. 47, Issue 1-3, pp. 7-42.
Hirschmuller et al., "Evaluation of Stereo Matching Costs on Images with Radiometric Differences", Pattern Analysis and Machine Intelligence, IEEE Transactions on (vol. 31, Issue: 9), (Sep. 2009).

* cited by examiner

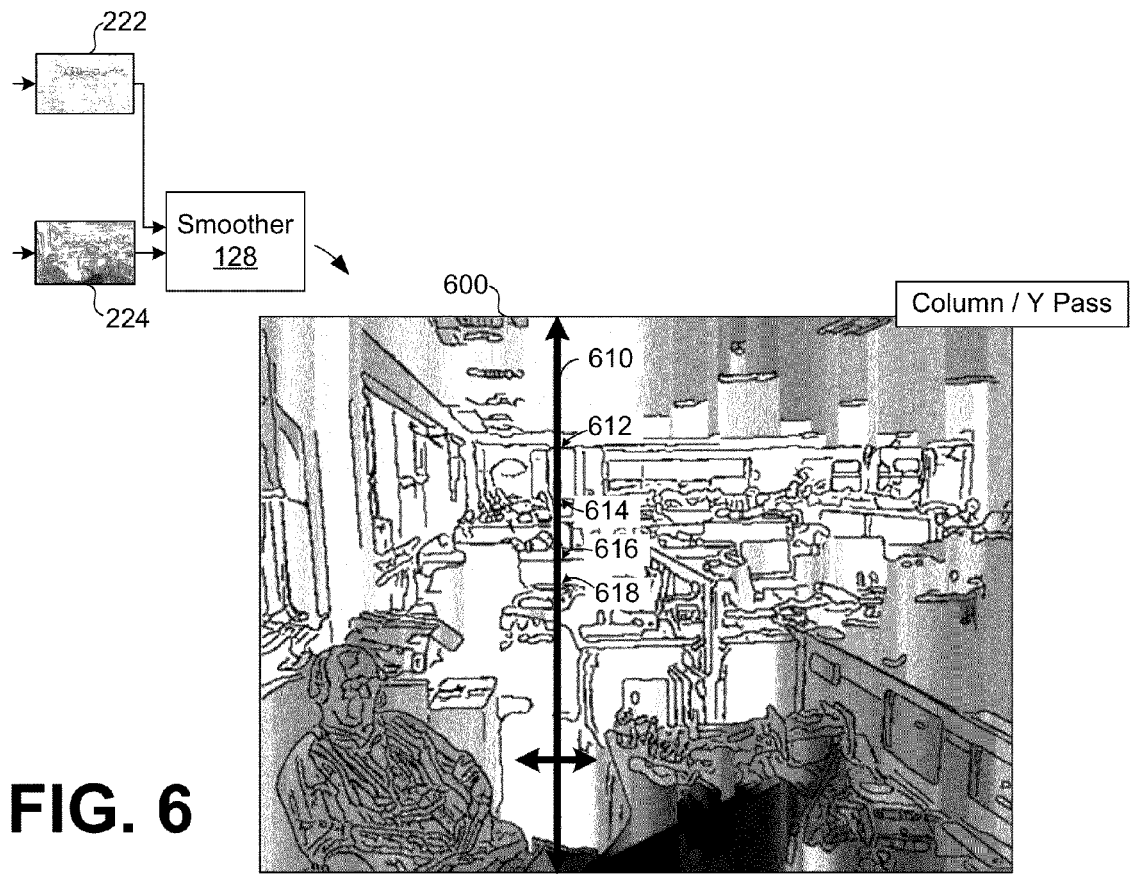
FIG. 6
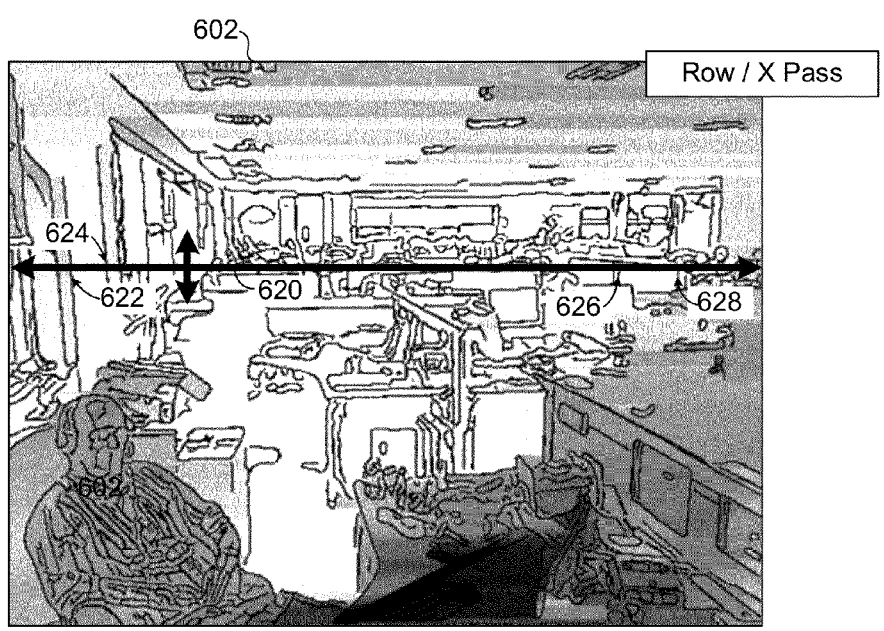

DEPTH MAP GENERATION AND POST-CAPTURE FOCUSING

CROSS-REFERENCE TO RELATED APPLICATIONS

This application claims the benefit of U.S. Provisional Application No. 61/891,648, filed Oct. 16, 2013, and claims the benefit of U.S. Provisional Application No. 61/891,631, filed Oct. 16, 2013, the entire contents of each of which are hereby incorporated herein by reference.

This application also makes reference to U.S. patent application Ser. No. 14/065,810, titled "Heterogeneous Mix of Sensors and Calibration Thereof," filed on even date herewith, the entire contents of which are hereby incorporated herein by reference.

BACKGROUND

Certain cameras, such as light-field or plenoptic cameras, rely upon a lens array over an image sensor and/or an array of image sensors to capture directional projection of light. Among other drawbacks, these approaches use relatively large and specialized image sensors which are generally unsuitable for other applications (e.g., video capture, video conferencing, etc.), use only a fraction of the information captured, and rely upon high levels of processing to deliver even a viewfinder image, for example. Further, some of these light-field or plenoptic camera devices require a relatively large height for specialized lens and/or sensor arrays and, thus, do not present practical solutions for use in cellular telephones.

BRIEF DESCRIPTION OF THE DRAWINGS

For a more complete understanding of the embodiments and the advantages thereof, reference is now made to the following description, in conjunction with the accompanying figures briefly described as follows:

FIG. 6 illustrates an example process of smoothing performed by the smoother of FIG. 1A according to an example embodiment.

Figure 1A:
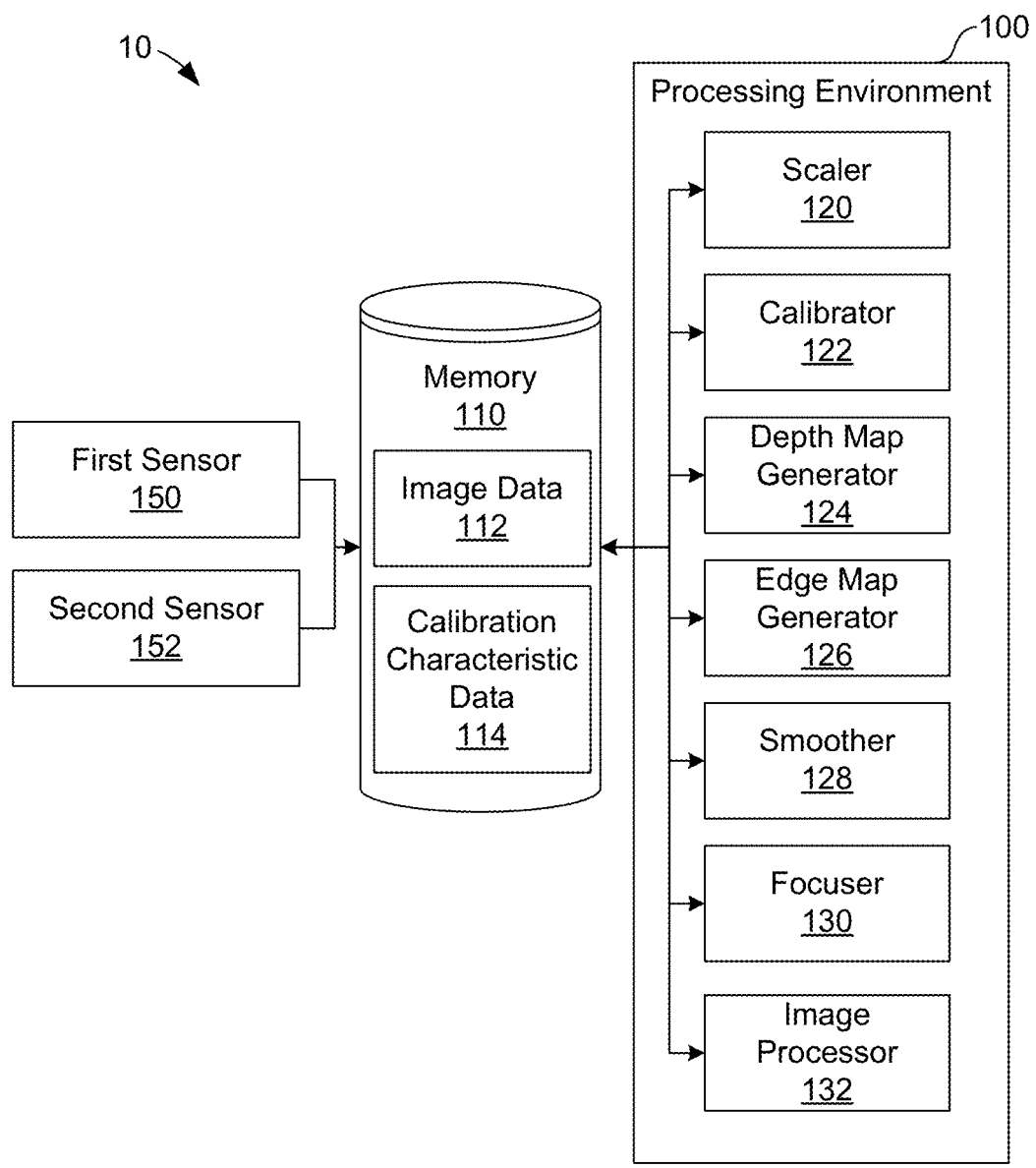
FIG. 1A illustrates a system for depth map generation and post-capture focusing according to an example embodiment.

The drawings illustrate are provided by way of example and should not be considered limiting of the scope of the embodiments described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positions of elements and features may be exaggerated to help visually convey certain principles. In the drawings, similar reference numerals among the figures generally designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments.

Certain cameras, such as light-field or plenoptic cameras, rely upon a lens array over an image sensor and/or an array of image sensors to capture directional projection of light. Among other drawbacks, these approaches use relatively large and specialized image sensors which are generally unsuitable for other applications (e.g., video capture, video conferencing, etc.), use only a fraction of the information captured, and rely upon high levels of processing to deliver even a viewfinder image, for example. Further, some of these light-field or plenoptic camera devices require a relatively large height for specialized lens and/or sensor arrays and, thus, do not present practical solutions for use in cellular telephones.

In this context, the embodiments described herein include a system and device for focusing and re-focusing. The embodiments may be relied upon to achieve, among other processing results, image processing results that are similar, at least in some aspects, to those achieved by light-field or plenoptic imaging devices. In certain embodiments, the system may omit some elements which are generally common in imaging systems, such as optical and/or mechanical focusing mechanisms and associated controls. By the opportunity to omit these system elements, costs of camera modules may be reduced. Further, instantaneous power draw during focusing and focus time may be reduced. Additionally, the overall size, weight, and footprint of camera modules may be reduced.

In one embodiment, the system includes a main color image sensor having a pixel density ranging from 3 to 20

Megapixels, for example, with color pixels arranged in a Bayer pattern, and a secondary luminance image sensor having a relatively lower pixel density. It should be appreciated, however, that the system is generally agnostic to the resolution and format of the main and secondary sensors, which may be embodied as sensors of any suitable type, pixel resolution, process, structure, or arrangement (e.g., infra-red, charge-coupled device (CCD), 3CCD, Foveon X3, complementary metal-oxide-semiconductor (CMOS), red-green-blue-clear (RGBC), etc.).

In one aspect, the system and device may be relied upon for focusing and re-focusing images after they are captured. For example, a luminance image provided by the secondary luminance sensor may be relied upon, in connection with the luminance component of an image from the main color image sensor, to generate a depth map representative of relative depth values. The depth map may be used for focusing and re-focusing, for example, or for object extraction, scene understanding, gesture recognition, etc. In other aspects, a mix of image sensors may be used for high dynamic range (HDR) image processing. Further, according to the embodiments described herein, the mix of image sensors may be calibrated for focusing and re-focusing, object extraction, scene understanding, gesture recognition, HDR image processing, etc.

Turning now to the drawings, a description of exemplary embodiments of a system and its components are provided, followed by a discussion of the operation of the same.

FIG. 1A illustrates a system 10 for depth map generation and post-capture focusing according to an example embodiment. The system 10 includes a processing environment 100, a memory 110, and first and second sensors 150 and 152, respectively. The processing environment 100 includes a scaler 120, a calibrator 122, a depth map generator 124, an edge map generator 126, a smoother 128, a focuser 130, and an image processor 132. The memory 110 includes memory areas for image data 112 and calibration characteristic data 114.

The processing environment 100 may be embodied as one or more processors, processing circuits, and/or combinations thereof. Generally, the processing environment 100 includes embedded (i.e., application-specific) and/or general purpose processing circuitry and/or software structures that process data, such as image data captured by the first and second sensors 150 and 152, for example. Further structural aspects of the processing environment 100 are described below with reference to FIG. 13. In one embodiment, among others, the processing environment 100 may include the scaler 120, calibrator 122, depth map generator 124, edge map generator 126, smoother 128, focuser 130, and image processor 132. Each of these elements of the processing environment 100, and the respective operation of each, is described in further detail below with reference to the remaining figures.

The first and second sensors 150 and 152 may be embodied as any suitable types of sensors, depending upon the application for use of the system 10. For example, in image processing applications, the first and second sensors 150 and 152 may be embodied as image sensors having the same or different pixel densities, ranging from a fraction of 1 to 20 Megapixels, for example. The first image sensor 150 may be embodied as a color image sensor having a first pixel density, and the second image sensor 152 may be embodied as a luminance image sensor having a relatively lower pixel density. It should be appreciated, however, that the system 10 is generally agnostic to the resolution and format of the first and second sensors 150 and 152, which may be embodied as sensors of any suitable type, pixel resolution, process, structure, or arrangement (e.g., infra-red, charge-coupled device (CCD), 3CCD, Foveon X3, complementary metal-oxide-semiconductor (CMOS), red-green-blue-clear (RGBC), etc.).

The memory 110 may be embodied as any suitable memory that stores data provided by the first and second sensors 150 and 152, among other data, for example. In this context, the memory 110 may store image and image-related data for manipulation and processing by the processing environment 100. As noted above, the memory 110 includes memory areas for image data 112 and calibration characteristic data 114. Various aspects of processing and/or manipulation of the image data 112 by the processing environment 100 are described in further detail below.

Figure 1B:
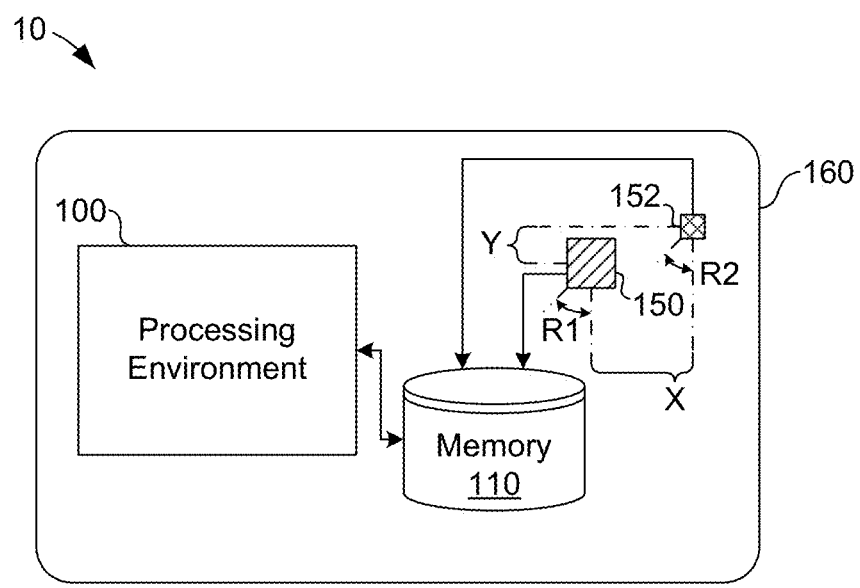
FIG. 1B illustrates a device for depth map generation and post-capture focusing the system of FIG. 1A according to an example embodiment.

FIG. 1B illustrates a device 160 for depth map generation and post-capture focusing the system of FIG. 1A according to an example embodiment. The device 160 includes the processing environment 100, the memory 110, and the first and second sensors 150 and 152 of FIG. 1A, among other elements. The device 160 may be embodied as a cellular telephone, tablet computing device, laptop computer, desktop computer, television, set-top box, personal media player, appliance, etc., without limitation. In other embodiments, the device 160 may be embodied as a pair of glasses, a watch, wristband, or other device which may be worn or attached to clothing. If embodied as a pair of glasses, then the sensors 150 and 152 of the device 160 may be positioned at opposite corners of rims or end-pieces of the pair of glasses.

As illustrated in FIG. 1B, the first and second sensors 150 and 152 are separated by a first distance X in a first dimension and by a second distance Y in a second dimension. The distances X and Y may vary among embodiments, for example, based on aesthetic and/or performance factors, depending upon the application or field of use for the device 160. Further, the relative positions (e.g., right verses left, top verses bottom, etc.) of the first and second sensors 150 and 152 may vary among embodiments. In this context, it is also noted that a relative difference in rotational or angular displacement (i.e., R1–R2) may exist between the first and second sensors 150 and 152. Although not explicitly illustrated, it should be appreciated that the device 160 may include one or more additional elements for image capture, such as lenses, flash devices, focusing mechanisms, etc., although these elements may not be relied upon in certain embodiments and may be omitted.

As described herein, the first and second sensors 150 and 152 may be embodied as sensors of similar or varied operating and structural characteristics. The differences in operating characteristics may be identified during manufacturing and/or assembly of the device 160, for example, based on manufacturing and/or assembly calibration processes. Additionally or alternatively, the differences in operating characteristics may be identified during post-assembly calibration processes. These differences may be quantified as calibration data which is representative of the operating characteristics of the first and second sensors 150 and 152, and stored in the memory 110 as the calibration characteristic data 114.

Among other operational aspects, the device 160 is configured to capture images using the first and second sensors 150 and 152. Based on the processing techniques and processes described herein, images captured by the first and second sensors 150 and 152 may be focused and re-focused after being captured. Generally, using images captured by the first and second sensors 150 and 152, the processing environment 100 is configured to generate a depth map including a mapping among relative depth values within a field of view of at least one of the images, generate an edge map, and smooth the relative depth values of the depth map using the edge map.

The relative depth values and/or the smoothed relative depth values may be used for focusing and re-focusing images after they are captured. Further, the processing techniques and processes described herein may be used for object extraction, scene understanding, gesture recognition, etc.

Figure 2:
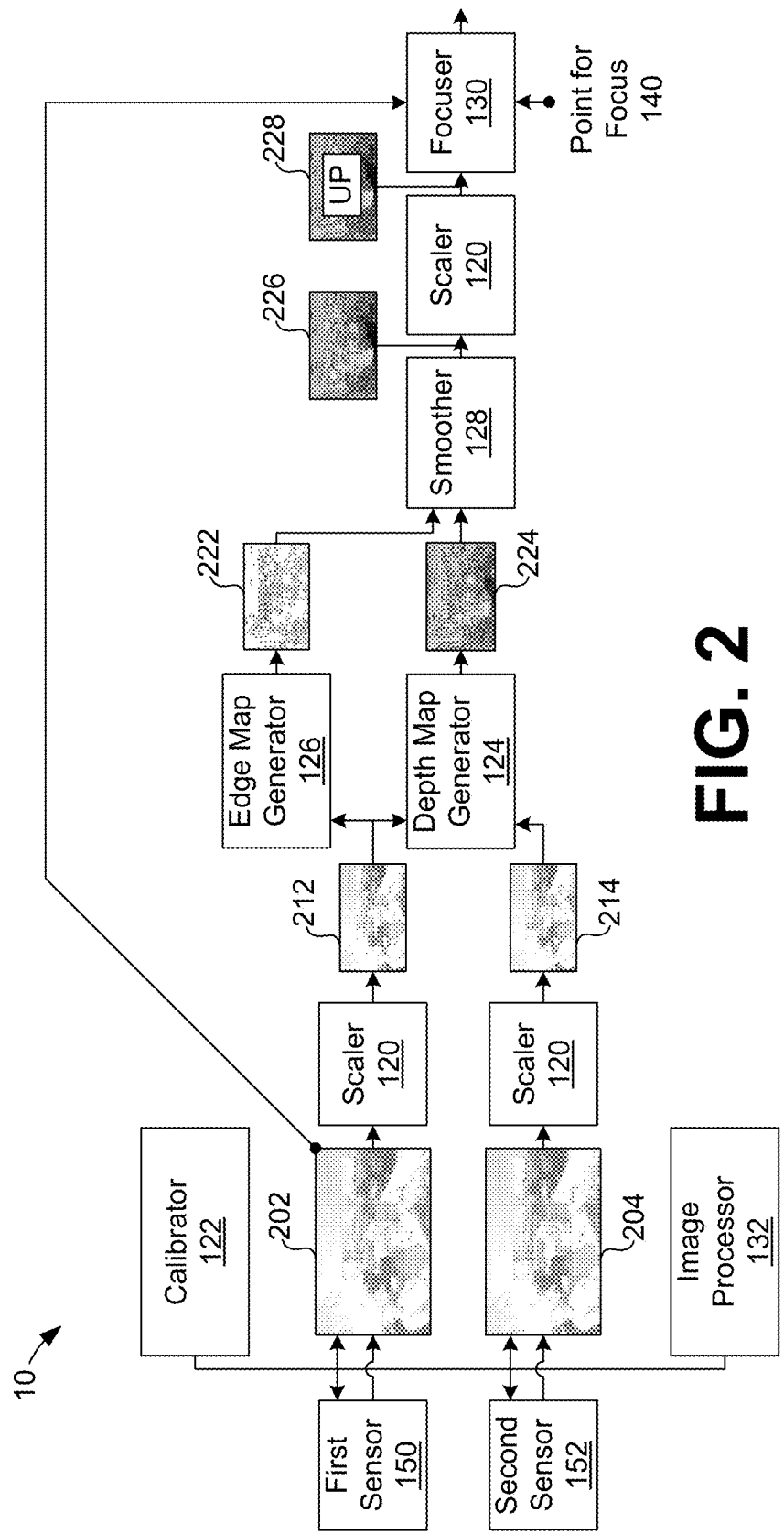
FIG. 2 illustrates a process flow for depth map generation and post-capture focusing the system of FIG. 1A according to an example embodiment.

FIG. 2 illustrates a process flow for depth map generation and post-capture focusing the system 10 of FIG. 1A according to an example embodiment. As illustrated in FIG. 2, the first sensor 150 generates a first image 202, and the second sensor 152 generates a second image 204. The first and second images 202 and 204 may be captured at a substantially same time. Alternatively, the first and second images 202 and 204 may be captured, respectively, by the first and second sensors 150 and 152, at different times. Data associated with the first and second images 202 and 204 may be stored in the memory 110 (FIG. 1).

According to certain aspects of the embodiments described herein, the first image 202 provided by the first sensor 150 is compared with the second image 204 provided by the second sensor 152, to determine a depth map. In this context, the first and second images 202 and 204 capture or are representative of substantially the same field of view. Generally, similar or corresponding image information (e.g., pixel data) among the first and second images 202 and 204 is shifted in pixel space between the first and second images 202 and 204 due to the relative difference in position (e.g., illustrated as X, Y, R1, and R2 in FIG. 1B) between the first and second sensors 150 and 152 on the device 160. The amount of this shift, per pixel, is representative of depth, because it is dependent (i.e., changes) upon the relative depths of items within a field of view of the images 202 and 204. Additionally, it is noted that the image information among the first and second images 202 and 204 is typically shifted in other aspects, such as luminance, color, color coding, pixel density, noise, etc., and these differences should be accounted for by the calibrator 122 of the system 10 before or while processing the images 202 and 204.

In alternative embodiments, the device 160 may include the first sensor 150, and the second sensor 152 may be omitted. In this case, the first sensor 150 may be relied upon to provide first and second images, sequentially in time, to determine a depth map. That is, two respective images may be captured in a relatively short period of time by the first image sensor 150, and these two images may be used to generate a depth map. The two images may be of the same or different pixel resolutions. Because the images are captured sequentially in time, the images may include a shift between them due to movement of the device 160 while the images are being captured, for example.

According to various embodiments described herein, the first and second images 202 and 204 may have the same or different pixel densities, depending upon the respective types and characteristics of the first and second image sensors 150 and 152, for example. Further, the first and second images 202 and 204 may be of the same or different image formats. For example, the first image 202 may include several color components of a color image encoded or defined according to a certain color space (e.g., red, green, blue (RGB); cyan, magenta, yellow, key (CMYK); phase alternating line (PAL); YUV or Y'UV; YCbCr; YPbPr, etc.), and the second image 204 may include a single component of another color space.

To the extent that the processes of depth map generation and post-capture focusing described herein rely upon one or more components of image data captured by the first and second sensors 150 and 152, the image processor 132 may extract those components, as necessary, for further processing. Further, to the extent that the characteristics of the first and second sensors 150 and 152 vary, such that the first and second images 202 and 204 deviate along a corresponding unit of measure or other qualitative or quantitative aspect, for example, the calibrator 122 may adjust one or more of the operating parameters of the first and second sensors 150 and 152 (e.g., operating voltages, timings, temperatures, exposure timings, etc.) or adjust one or more of the first and second images 202 and 204 to address the difference or differences. In other words, the calibrator 122 may seek to align or normalize aspects of the operating characteristics of the first and second sensors 150 and 152 or the image data captured by the first and second sensors 150 and 152. In this way, downstream operations performed by other elements in the system 10 may be aligned, as necessary, for suitable performance and results in image processing.

As further illustrated in FIG. 2, the first and second images 202 and 204 are provided to the scaler 120. Generally, the scaler 120 downscales and/or upscales images or maps (e.g., depth and/or edge maps), as described herein, in pixel density. It is noted that, in certain embodiments, the scaler 120 may be omitted from the process flow of FIG. 2, for one or more of the first and second images 202 and 204, as described in connection with other embodiments. The scaler 120 is generally relied upon, for example, to reduce the pixel processing loads of the edge map generator 126 and the depth map generator 124, to align pixel densities among the first and second images 202 and 204 (e.g., if the first and second sensors 150 and 152 vary in pixel density), and/or to reduce or compact image features for edge or depth detection. The downscaling and/or upscaling operations of the scaler 120 may be embodied according to nearest-neighbor interpolation, bi-linear interpolation, bi-cubic interpolation, supersampling, and/or other suitable interpolation techniques, or combinations thereof, without limitation.

After the scaler 120 downscales the first image 202 into the first downscaled image 212 and downscales the second image 204 into the second downscaled image 214, the first downscaled image 212 is provided to the edge map generator 126. The edge map generator 126, generally, generates an edge map by identifying edges in at least one image. In other words, the edge map generator 126 generates an edge map by identifying edges in one or more of the first or second downscaled images 212 and 214. In the embodiment illustrated in FIG. 2, the edge map generator 126 generates the edge map 222 by identifying edges in the first downscaled image 212, although the edge map 222 may be generated by identifying edges in the second downscaled image 214. It should be appreciated that the performance of the edge map generator 126 may be improved by identifying edges in downscaled, rather than higher pixel density, images. For example, edges in higher density images may span several (e.g., 5, 10, 15, or more) pixels. In contrast, such edges may span relatively fewer pixels in downscaled images. Thus, in certain embodiments, the scaler 120 may be configured to downscale one or more of the first or second images 202 or 204 so as to provide a suitable pixel density for accurate edge detection by the edge map generator 126.

Figure 3:
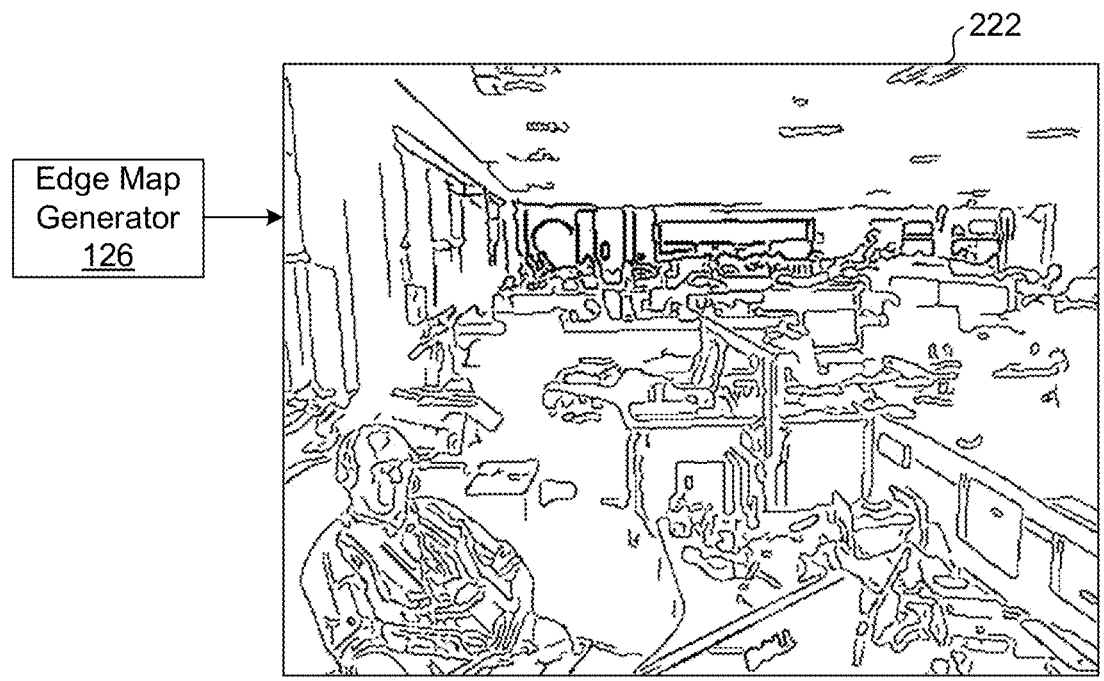
FIG. 3 illustrates an example edge map generated by the edge map generator of FIG. 1A according to an example embodiment.

FIG. 3 illustrates an example edge map 222 generated by the edge map generator 126 of FIG. 1A according to an example embodiment. As illustrated in FIG. 3, the edge map 222 is embodied by data representative of edges. In the context of FIGS. 2 and 3, the edge map 222 is embodied by data representative of edges in the first image 202. In one embodiment, the edge map generator 126 generates the edge map 222 by identifying pixels or pixel areas in the first image 202 where pixel or pixel area brightness quickly changes or encounters a discontinuity (i.e., at "step changes"). Points at which pixel brightness change quickly are organized into edge segments in the edge map 222 by the edge map generator 126. The changes may be due to changes in surface or material orientation, changes in surface or material properties, or variations in illumination, for example. Data associated with the edge map 222 may be stored by the edge map generator 126 in the memory 110 (FIG. 1).

Referring again to FIG. 2, the first and second downscaled images 212 and 214 are also provided to the depth map generator 124. The depth map generator 124, generally, generates a depth map including a mapping among relative depth values in a field of view based on a difference between pixels of a first image and pixels of a second image. In the context of FIG. 2, the depth map generator 124 generates a depth map 224 including a mapping of relative depth values based on differences between pixels of the first downscaled image 212 and pixels of the second downscaled image 214.

Figure 4:
FIG. 4 illustrates an example depth map generated by the depth map generator of FIG. 1A according to an example embodiment.
Figure 7:
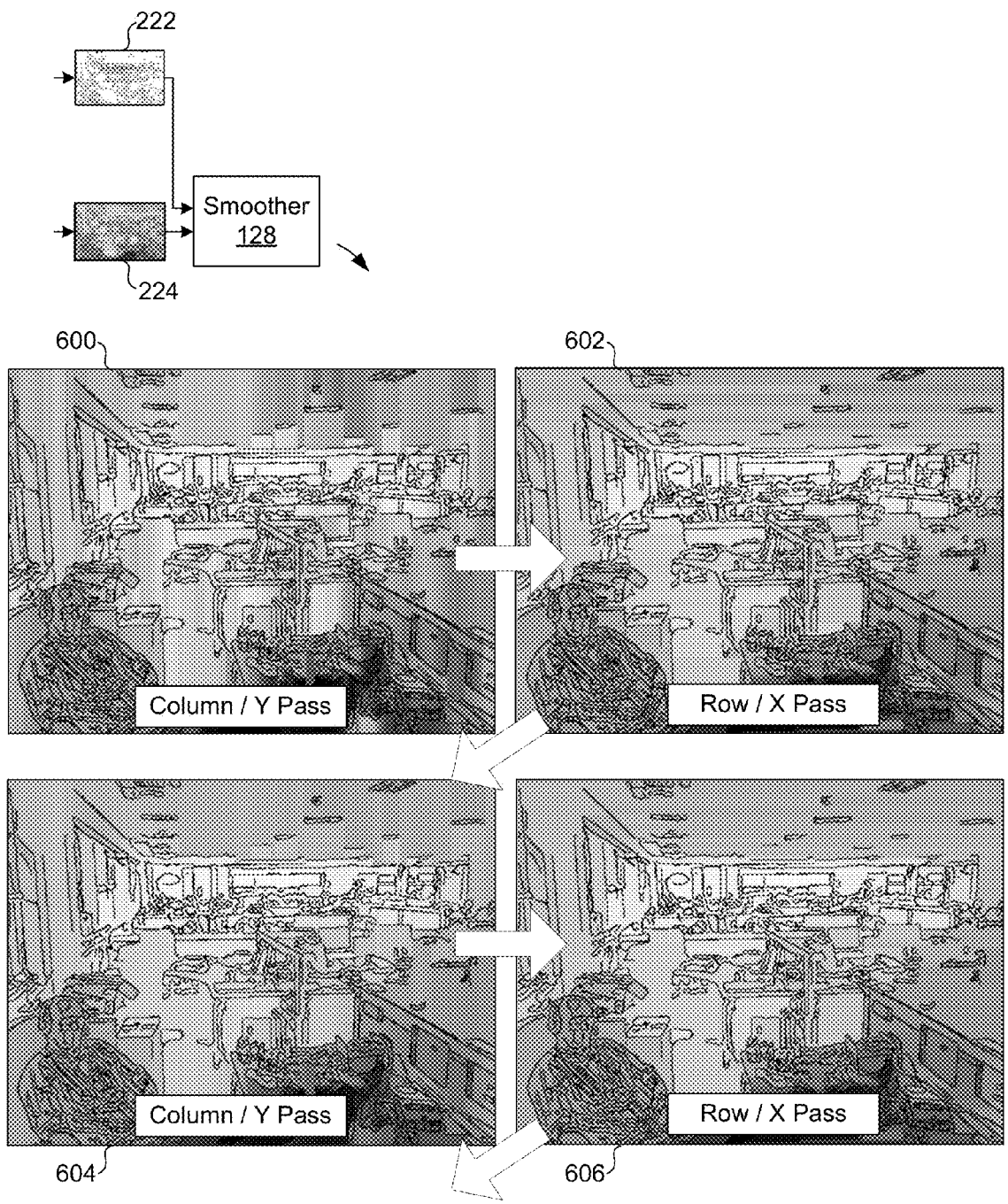
FIG. 7 further illustrates the example process of smoothing performed by the smoother of FIG. 1A according to an example embodiment.

FIG. 4 illustrates an example depth map 224 generated by the depth map generator 124 of FIG. 1A according to an example embodiment. As illustrated in FIG. 4, the depth map 224 is embodied by data representative of relative depths in a field of view based on differences between pixels of the first downscaled image 212 and pixels of the second downscaled image 214. In FIG. 4, relatively darker areas are closer in depth and relatively lighter areas are further in depth, from the point of view of the first and second image sensors 150 and 152 and/or the device 160 (FIG. 1B). It should be appreciated that the relatively darker and lighter areas in FIG. 4 are representative of depth values. That is, relatively darker areas are representative of data values (e.g., per pixel data values) associated with less depth, and relatively lighter areas are representative of data values associated with more depth. In the context of FIGS. 6 and 7, as further described below, the depth map 224 is referred to as a "raw" depth map, because it is representative of unsmoothed or unfiltered depth values. Data associated with the depth map 224 may be stored by the depth map generator 124 in the memory 110 (FIG. 1).

The depth map generator 124 may generate the depth map 224, for example, by calculating a sum of absolute differences (SAD) between pixel values in a neighborhood of pixels in the downscaled image 212 and a corresponding neighborhood of pixels in the downscaled image 214, for each pixel in the downscaled images 212 and 214. Each SAD value may be representative of a relative depth value in a field of view of the downscaled images 212 and 214 and, by extension, the first and second images 202 and 204. In alternative embodiments, rather than (or in addition to) calculating relative depth values of the depth map 224 by calculating a sum of absolute differences, other stereo algorithms, processes, or variations thereof may be relied upon by the depth map generator 124. For example, the depth map generator 124 may rely upon squared intensity differences, absolute intensity differences, mean absolute difference measures, or other measures of difference between pixel values, for example, without limitation. Additionally, the depth map generator 124 may rely upon any suitable size, shape, or variation of pixel neighborhoods for comparisons between pixels among images. Among embodiments, any suitable stereo correspondence algorithm may be relied upon by the depth map generator 124 to generate a depth map including a mapping among relative depth values between images.

According to certain embodiments, the depth map generator 124 generates the depth map 224 by iteratively searching for and evaluating depth among images of various pixel densities. For example, the scaler 120 may downscale each of the first and second images 202 and 204 into several downscaled images (e.g., 5× downscale, 10× downscale, 15× downscale, etc.), and the depth map generator 124 may generate the depth map 224 by iteratively searching for and evaluating depth among pairs of the downscaled images which correspond to the first and second images 202 and 204.

Figure 5:
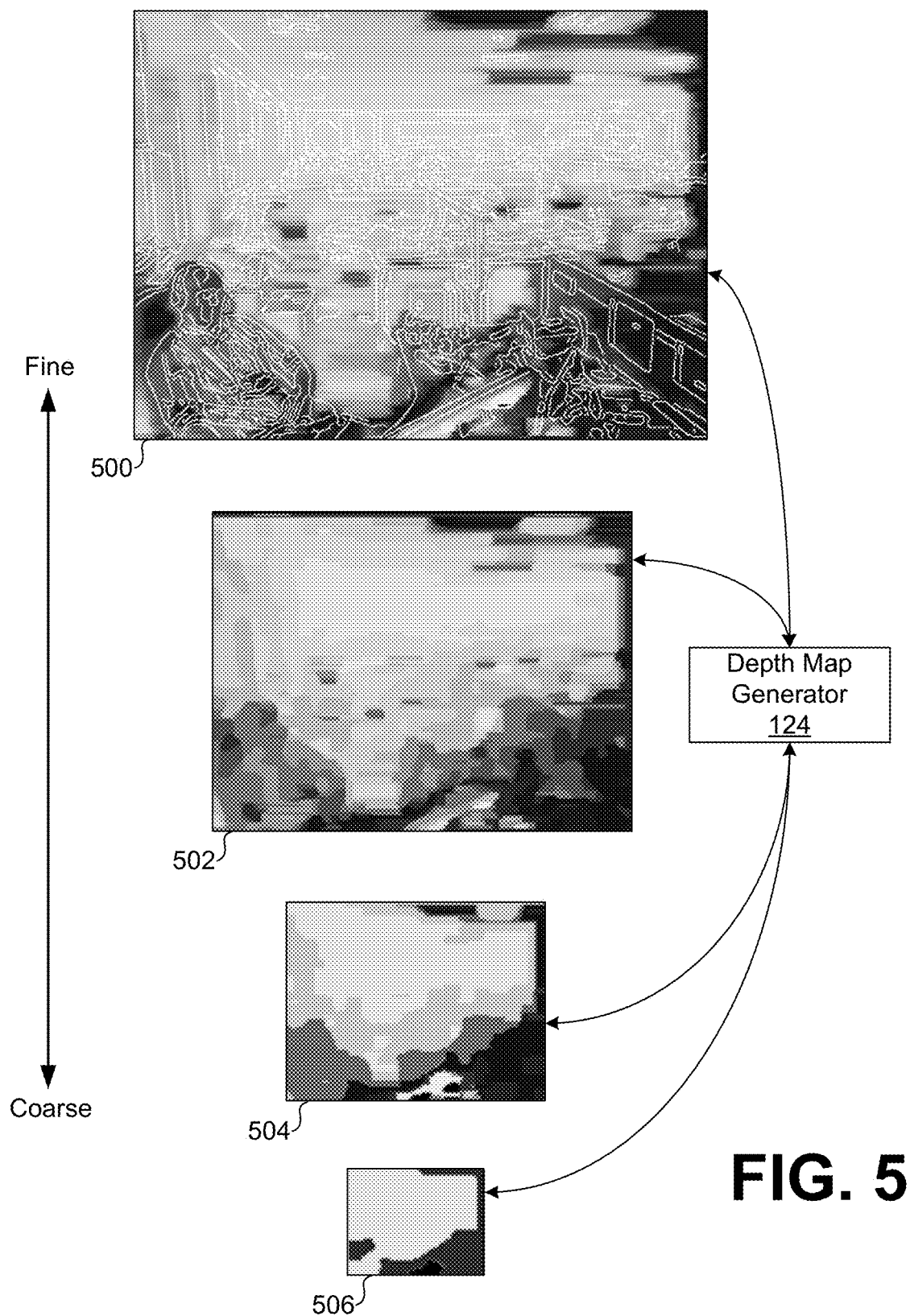
FIG. 5 illustrates graduated levels of pyramid disparity depth maps generated and relied upon by the depth map generator of FIG. 1A according to an example embodiment.

In the context of iteratively searching for and evaluating depth among images of various pixel density, FIG. 5 illustrates graduated levels of pyramid disparity depth maps generated and relied upon by the depth map generator 124 of FIG. 1A according to an example embodiment. In FIG. 5, depth maps 500, 502, 504, and 506 of graduated pixel density are illustrated. The depth map 500 is embodied as a depth map of relatively high pixel density, and the depth maps 502, 504, and 506 are embodied as depth maps of progressively lower pixel density, as illustrated in FIG. 5. As suggested above, each of the depth maps 500, 502, 504, and 506 may be generated by the depth map generator 124 based on images of corresponding pixel density provided by the scaler 120.

Generally, when generating a depth map using pyramid disparity, the depth map generator 124 first generates the depth map 506 by comparing relatively low pixel density images (i.e., low pixel density copies of the first and second images 202 and 204). Afterwards, the depth map generator 124 generates the depth map 504 by comparing images of relatively higher pixel density (i.e., images of higher pixel density than those used to generate the depth map 506) and with reference to the depth map 506. That is, when generating the depth map 504, the depth map generator makes reference to the depth map 506. For example, when generating the depth map 504, the depth map generator 124 may reference the regions of depth identified in the depth map 506, to determine the manner in which to tailor the search for depth among a pair of images of higher pixel density. Thus, the depth map 506 may be considered a coarse map for depth reference, and the depth map 504 may be determined by the depth map generator 124 by identifying shifts in pixel values among a pair of downscaled images and with reference to the depth map 506.

The generation of each of the depth maps 504, 502, and 500 may proceed in a similar manner, with the depth map generator 124 referring to lower or coarser density depth maps for the generation of each relatively finer density depth map. On the basis of or with reference to coarser density depth maps, the depth map generator 124 may be able to tailor the manner in which finer depth maps are generated, for speed or accuracy, for example. Additionally, a depth map of suitable pixel resolution may be generated using a pyramid of images of increasing pixel density, starting with comparisons of lower or coarser density images and proceeding to higher or finer density images. The progression from lower to higher pixel density in the generation of depth maps, with reference back to coarser depth maps, may assist with the generation of a final depth map having suitable pixel density in relatively less time and using a relatively smaller amounts of memory, for example.

In other embodiments, the depth map generator 124 may stitch together one or more depth maps. In the context of panoramic images, for example, the depth map generator 124 may stitch together one or more depth maps to generate a panoramic depth map. As further described below, for panoramic depth maps, smoothing may occur across or among depth maps which have been stitched together, to help remove discontinuities in depth due to occlusions, etc.

After the edge map generator 126 generates the edge map 222 and the depth map generator 124 generates the depth map 224, the smoother 128 smooths the relative depth values of the depth map 224 using the edge map 222. For example, according to one embodiment, the smoother 128 filters columns (i.e., in a first direction) of depth values of the depth map 224 between a first pair of edges in the edge map 222. The smoother 128 further filters rows (i.e., in a second direction) of depth values of the depth map 224 between a second pair edges in the edge map 222. The process of filtering along columns and rows may proceed iteratively between filtering columns and rows, until a suitable level of smoothing has been achieved.

FIG. 6 illustrates an example process of smoothing performed by the smoother 128 of FIG. 1A according to an example embodiment. In FIG. 6, the depth map 600 is smoothed or filtered along columns (i.e., in a first direction Y) of depth values and between pairs of edges, and the depth map 602 is smoothed or filtered along rows (i.e., in a second direction X) of depth values and between pairs of edges. With reference to FIGS. 3 and 4, the depth map 600 is representative, for example, of depth values after a first pass of smoothing depths along columns, using the raw depth map 224 as a basis for depth values and the edge map 222 as a basis for edges. The depth map 602 is representative of smoothed depth values after a second pass of smoothing depths along rows, using the depth map 600 as a starting basis for depth values.

More particularly, in the generation of the depth map 600 by the smoother 128, the smoother 128 scans along columns of the depth map 600, from a right to a left, for example, of the map. The columns may be scanned according to a column-wise pixel-by-pixel shift of depth values in the map. Along each column, edges which intersect the column are identified, and the depth values within or between adjacent pairs of intersecting edges are filtered. For example, as illustrated in FIG. 6, along the column 610 of depth values, a pair of adjacent edges 612 and 614 is identified by the smoother 128. Further, the pair of adjacent edges 616 and 618 is identified by the smoother 128. Once a pair of adjacent edges is identified along a column, the smoother 128 filters the depth values between the pair of edges, to provide a smoothed range of depth values between the pair of edges. As illustrated in FIG. 6, smoothing or filtering depth values between pairs of edges is performed by the smoother 128 along the column 610, on a per edge-pair basis. In this way, raw depth values in the raw depth map 224 (FIG. 4) are smoothed or filtered with reference to the edges in the edge map 222 (FIG. 3). Thus, depth values are generally extended and smoothed with a certain level of consistency among edges.

As further illustrated in FIG. 6, starting with the depth map 600 as input, the smoother 128 scans along rows of the depth map 602, from a top to a bottom, for example, of the map. The rows may be scanned according to a row-wise pixel-by-pixel shift of depth values in the map. Along each row, edges which intersect the row are identified, and the depth values within or between adjacent pairs of intersecting edges are filtered. For example, along the row 620 of depth values, a pair of adjacent edges 622 and 624 is identified by the smoother 128. Further, the pair of adjacent edges 626 and 628 is identified by the smoother 128. Once a pair of adjacent edges is identified along a row, the smoother 128 filters the depth values between the pair of edges, to provide a smoothed range of depth values between the pair of edges. As illustrated in FIG. 6, smoothing or filtering depth values between pairs of edges is performed by the smoother 128 along the row 620, on a per edge-pair basis. In this way, depth values are generally extended and smoothed with a certain level of consistency among edges. It should be appreciated here that several pairs of intersecting edges may be identified along each column 610 and row 620 in a depth map, and depth values may be smoothed between each of the pairs of edges.

FIG. 7 further illustrates the example process of smoothing performed by the smoother 128 of FIG. 1A according to an example embodiment. As illustrated in FIG. 7, the smoother 128 smooths a depth map along columns and rows of depth values iteratively, alternating between smoothing along columns and rows. In this context, as illustrated in FIG. 7, the smoother 128 smooths the depth map 224 along columns to generate the depth map 600, then smooths the depth map 600 along rows to generate the depth map 602, then smooths the depth map 602 along columns to generate the depth map 604, and then smooths the depth map 604 along rows to generate the depth map 606. In various embodiments, this iterative process of smoothing along columns and rows may repeat for a predetermined number of times depending upon various factors. Further, it should be appreciated that the process may begin and end with smoothing along rows or smoothing along columns, without limitation. Any of the depth maps 600, 602, 604, or 606 may be selected as a suitable depth map. Again, as described above, the smoother 128 generally seeks to smooth or filter depth values from the raw depth map 224 with reference to, between, and/or among edges in the edge map 222, generating a correlation among depth values and edges.

As illustrated among the depth maps 600, 602, 604, or 606, the iterative process of smoothing along columns and rows generally spreads, smooths, and/or filters depth values within edge-bounded regions in both column and row (i.e., X and Y) directions. In this sense, the smoother 128 smooths discontinuities in depth values in the raw depth map 224, at least to a certain extent, within edge-bounded regions defined by the edge map 222. The discontinuities in depth values may be attributed to occlusions, for example. That is, certain image data may be captured in the first image 202 (FIG. 2), although such data may be omitted entirely from the second image 204 (FIG. 2). This discrepancy or occlusion may be due to a parallax difference among the first and second sensors 150 and 152 based on their respective positions on the device 160 (FIG. 1B). To a certain extent, discontinuities in depth values may also be found along the distal sides or edges of the raw depth map 224, for example, especially if the field of view of the first image 202 varies from that of the second image 204. Further, in the context of panoramic images, the smoother 128 may smooth discontinuities in depth values which occur across or among depth maps which have been stitched together, to help remove discontinuities in depth due to occlusions, etc.

Figure 8:
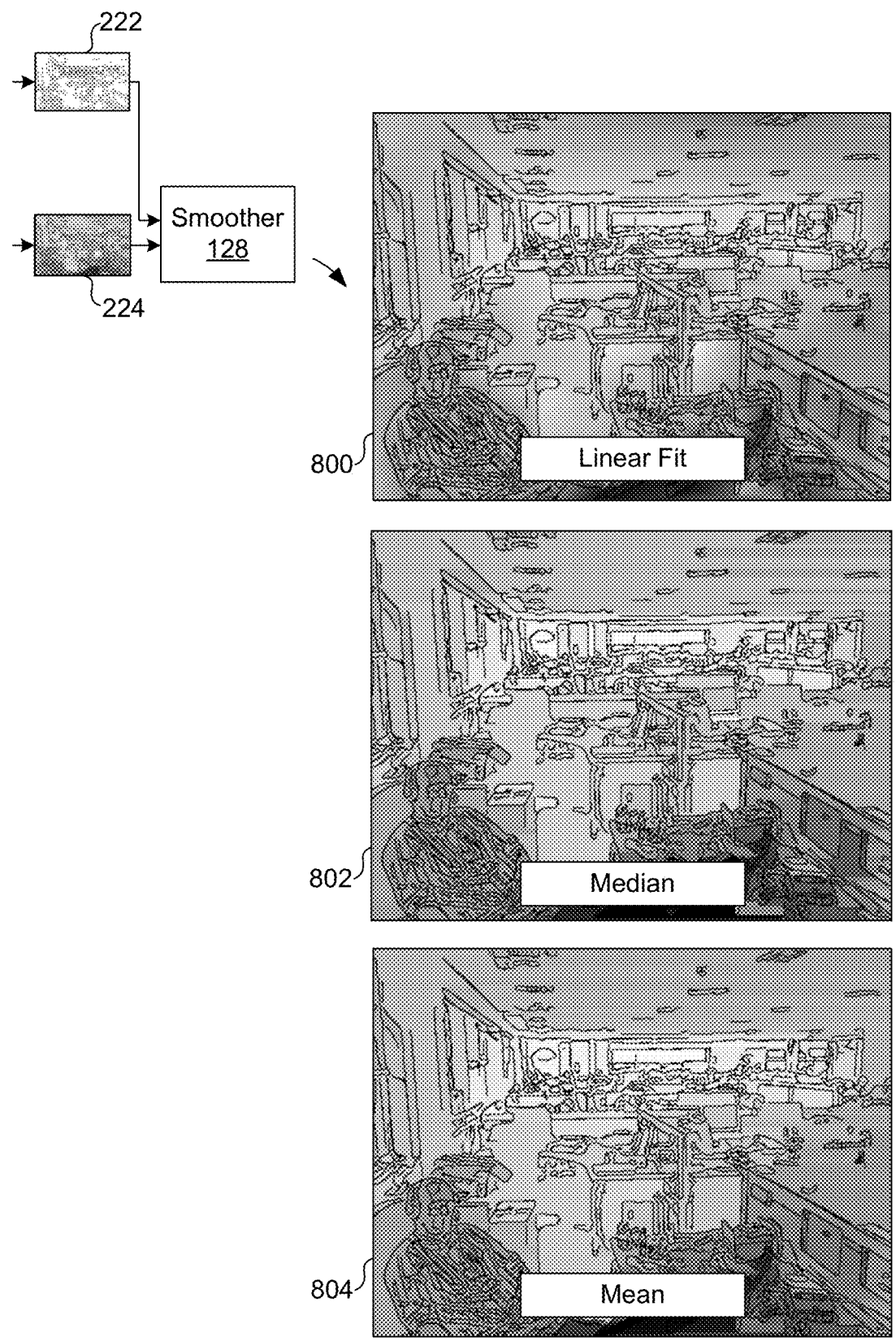
FIG. 8 illustrates the results of various smoothing processes performed by the smoother of FIG. 1A according to an example embodiment.

Turning to FIG. 8, the results of various smoothing processes performed by the smoother 128 of FIG. 1A are illustrated according to an example embodiment. In FIG. 8, three depth maps 800, 802, and 804 are illustrated. The depth map 800 was generated by the smoother 128 using a linear fit of depth values between edges, the depth map 802 was generated by the smoother 128 using a median of depth values between edges, and the depth map 804 was generated by the smoother 128 using a mean of depth values between edges. In other words, to generate the depth map 800, the smoother 128 calculates a linear fit for each depth value along a column or a row, using the depth values between pairs of edges along the column or the row. To generate the depth map 802, the smoother 128 calculates a median of depth values along a column or the row, using the depth values between pairs of edges along the column or the row. To generate the depth map 804, the smoother 128 calculates a mean of depth values along a column or the row, using the depth values between pairs of edges along the column or the row.

As illustrated in FIG. 8, by calculating a linear fit, median, or mean of depth values between edges, the "fit" of depth values among edge-bounded regions varies among the depth maps 800, 802, and 804. It should be appreciated that the smoother 128 may rely upon ways to smooth depth values other than by calculating a linear fit, median, or mean of values. The smoother 128 may be configured to operate based on a linear fit, median, mean, or other manner of calculating smoothed or filtered depth values depending, for example, upon the application for use of the resulting depth map, processing capacity, speed, etc. In this context, it should be appreciated that a linear fit of depth values may be preferable for some applications, while a mean fit may be preferable for other applications. Further, it should be appreciated that a median fit of depth values may be preferable over a mean fit, although a tradeoff in processing requirements exists, because identifying a median of depth values between edges depends upon a sort of the values which is not necessary for identifying a mean of the depth values.

Referring back to FIG. 2, after the smoother 128 smooths the depth values in the depth map 224, to provide a smoothed depth map 226, the smoother 128 provides the smoothed depth map 226 to the scaler 120. The scaler 120 upscales the smoothed depth map 226, and provides an upscaled depth map 228 to the focuser 130. Generally, the upscaled depth map 228 includes a density of depth values which corresponds to the pixel density of the first and/or second images 202 and 204. Using the upscaled depth map 228, the focuser 130 may focus and/or re-focus one or more pixels in the first image 202, for example, with reference to corresponding values of depth in the depth map 224.

Figure 9A:
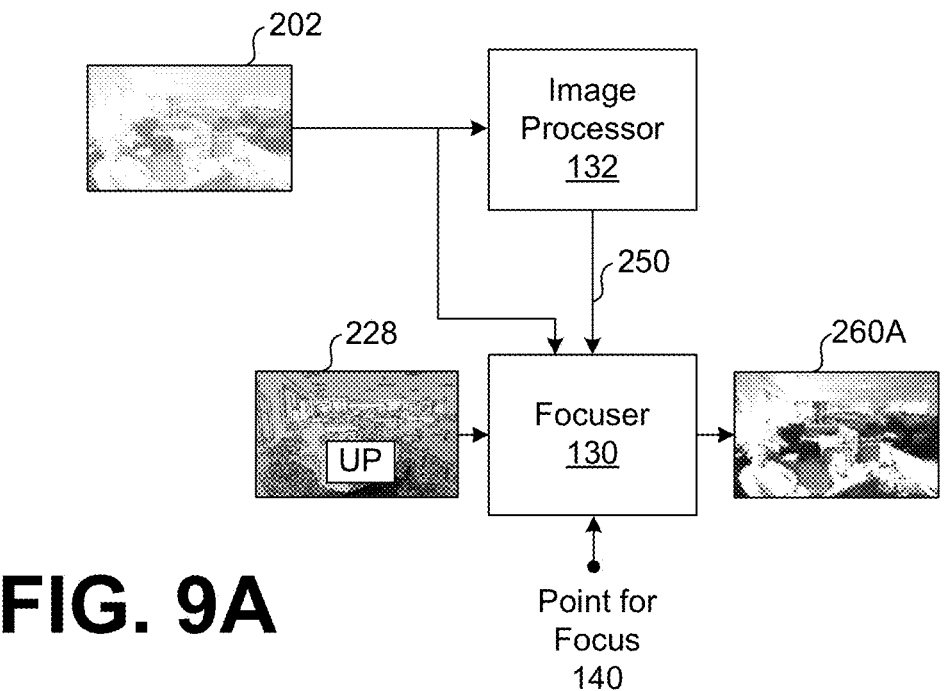
FIG. 9A illustrates a process flow for focusing and/or refocusing elements of the system of FIG. 1A according to an example embodiment.

In the context of focusing and/or refocusing, FIG. 9A illustrates a process flow for focusing and/or refocusing elements of the system 10 of FIG. 1A according to an example embodiment. As illustrated in FIG. 9A, the focuser 130 receives the upscaled depth map 228, the first image 202, and a point for focus 140. Additionally, the image processor 132 receives the first image 202 and provides a blurred replica 250 of the first image 202 to the focuser 130. Generally, the focuser 130 selectively focuses the first image 202 according to the point for focus 140, by blending portions of the blurred replica 250 with the first image 202, with reference to the relative depth values of the upscaled depth map 228 as a measure for blending. The focuser 130 provides an output image 260A based on a blend of the first image 202 and the blurred replica 250.

The point for focus 140 may be received by the device 160 (FIG. 1B) using any suitable input means, such as by capacitive touch screen, mouse, keyboard, electronic pen, etc. That is, a user of the device 160 may, after capture of the first and second images 202 and 204 by the device 160, select a point on the first image 202 (or the second image 204) to be selectively focused using a capacitive touch screen, mouse, keyboard, electronic pen, etc. Here, it is noted that the first image 202 may be captured by the first sensor 150 according to a relatively large depth of field. In other words, the first image 202 may be substantially focused throughout its field of view, for example, based on a sufficiently small optical aperture, etc. Thus, after capture of the first image 202, the focuser 130 may selectively focus areas of the first image 202 based on depth, by simulating a focal point and associated in-focus depth of field of the first image 202 along with other depths of field which are out of focus (i.e., blurred).

According to one embodiment, for a certain point of focus 140 selected by a user, the focuser 130 identifies a corresponding depth value (i.e., a selected depth value for focus) in the upscaled depth map 228, and evaluates a relative difference in depth between the selected depth value and each other depth value in the upscaled depth map 228. Thus, the focuser 130 evaluates the depth values in the upscaled depth map 228 according to relative differences from the point of focus 140.

In turn, the focuser 130 blends the first image 202 and the blurred replica 250 based on relative differences in depth, as compared to the point of focus 140.

In one embodiment, the blurred replica 250 may be generated by the image processor 132 using a Gaussian blur or similar filter, and the focuser 130 blends the first image 202 and the blurred replica 250 according to an alpha blend. For example, at the point of focus 140, the focuser 130 may form a composite of the first image 202 and the blurred replica 250, where the first image 202 comprises all or substantially all information in the composite and the blurred replica 250 comprises no or nearly no information in the composite. On the other hand, for a point in the first image 202 having a relatively significant difference in depth as compared to the point of focus 140 in the first image 202, the focuser 130 may form another composite of the first image 202 and the blurred replica 250, where the first image 202 comprises no or nearly no information in the composite and the blurred replica 250 comprises all or substantially all information in the composite.

The focuser 130 may evaluate several points among the first image 202 for difference in depth as compared to the point of focus 140, and generate or form a composite image for each point based on relative differences in depth, as compared to the point of focus 140 for focus 140 as described above. The composites for the various points may then be formed or joined together by the focuser 130 into the output image 260A. In one embodiment, the focuser 130 may evaluate individual pixels in the first image 202 for difference in depth as compared to the point for focus 140, and generate or form a composite image for each pixel (or surrounding each pixel) based on relative differences in depth embodied in the depth values of the depth map 224, as compared to the point of focus 140.

According to the operation of the focuser 130, the output image 260A includes a region of focus identified by the point for focus 140, and a blend of regions of progressively less focus (i.e., more blur) based on increasing difference in depth as compared to the point for focus 140. In this manner, the focuser 130 simulates a focal point and associated in-focus depth of field in the output image 260A, along with other depths of field which are out of focus (i.e., blurred). It should be appreciated that, because the depth map 224 includes several graduated (or nearly continuous) values of depth, the output image 260A also includes several graduated ranges of blur or blurriness. In this way, the focuser 130 simulates the effect of capturing the image 202 using a relatively larger optical aperture, and the point of focus when capturing the image 202 may be altered after the image 202 is captured. Particularly, several points for focus 140 may be received by the focuser 130 over time, and the focuser 130 may generate respective output images 260A for each point for focus 140.

Figure 9B:
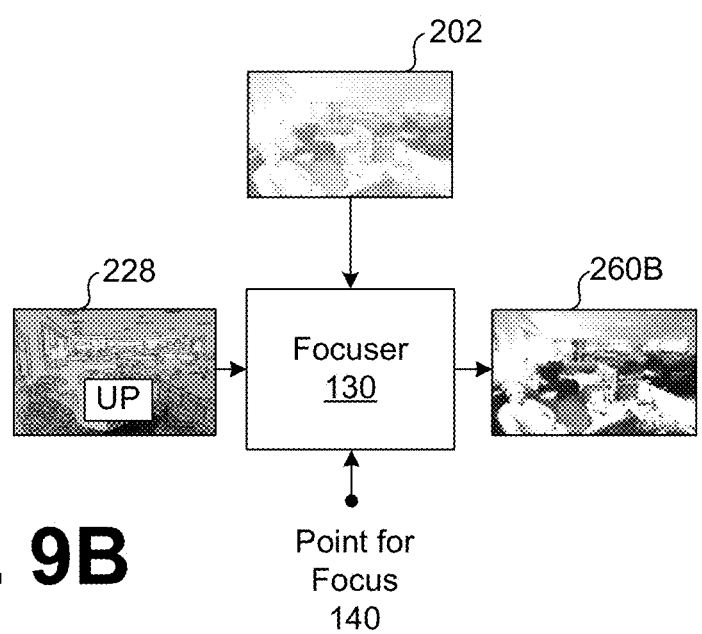
FIG. 9B illustrates another process flow for focusing and/or refocusing elements of the system of FIG. 1A according to an example embodiment.

FIG. 9B illustrates another process flow for focusing and/or refocusing elements of the system 10 of FIG. 1A according to an example embodiment. According to the embodiment of FIG. 9B, rather than relying upon the blurred replica 250, the focuser 130 selectively focuses regions of the first image 202 without using the blurred replica 250. In this context, according to the embodiment illustrated in FIG. 9B, the focuser 130 determines a point spread per pixel for pixels of the first image 202, to generate the output image 260B. For example, for pixels with little or no difference in depth relative to the point for focus 140, the focuser 130 may form the output image 260 using the pixel values in the first image 202 without (or with little) change to the pixel values. On the other hand, for pixels with larger differences in depth relative to the point for focus 140, the focuser 130 may determine a blend of the value of the pixel and its surrounding pixel values based on a measure of the difference. In this case, rather than relying upon a predetermined blurred replica, the focuser 130 may determine a blend of each pixel, individually, according to values of neighboring pixels. For any given pixel in the output image 260B, the amount of contribution from neighboring pixels for that pixel may depend upon difference in depth from the point for focus. For example, for larger differences in depth, the contribution from surrounding pixels may be greater both in terms weight of contribution and in number of contributing pixels.

In the embodiment of FIG. 9A, the focuser 130 again simulates the effect of capturing the image 202 using a relatively larger optical aperture, and the point of focus when capturing the image 202 may be altered after the image 202 is captured. Particularly, several points for focus 140 may be received by the focuser 130 over time, and the focuser 130 may generate respective output images 260B for each point for focus 140.

It is noted that the use of the blurred replica 250 when focusing or re-focusing, as in the embodiment of FIG. 9A, may be less processing-intensive than determining a point spread per pixel, as in the embodiment of FIG. 9B. Thus, depending upon the processing capabilities of the processing environment 100 (FIGS. 1A and 1B) and other factors (e.g., battery life, memory constraints, etc.), the device 160 may be rely upon one or a combination of the focusing and/or refocusing techniques described in connection with FIGS. 9A and 9B, or a combination thereof.

In still another embodiment, focusing and/or refocusing may be achieved by focus stacking using elements of the system 10 of FIG. 1A. For example, if multiple images, each having a different depth of field and/or focus point, are captured by the first sensor 150, then the focuser 130 may blend the multiple images to generate a selectively focused image. Particularly, the focuser 130 may blend the multiple images using relative depth values from a depth map generated based on a pair of the multiple images. Alternatively, the focuser 130 may blend the multiple images using relative depth values from a depth map generated based on one of the multiple images and another image captured by the second sensor 152.

In this context, focus stacking generally consists of capturing multiple images, each focused at a different focal point and/or having a different depth of field, and then selectively blending or combining sharp and blurred regions of the multiple images to simulate the effect of refocusing to a particular depth. In some embodiments, the device 160 (FIG. 1) may include a focusing mechanism for the sensor 150. In such an embodiment, the sensor 150 may be used to capture multiple images having different focus points and/or different depths of field, and the focuser 130 may blend the multiple images to generate a selectively focused image. In this case, a depth map, generated as described herein, may be relied upon by the focuser 130 to select which portions of the images to blend.

Figure 10:
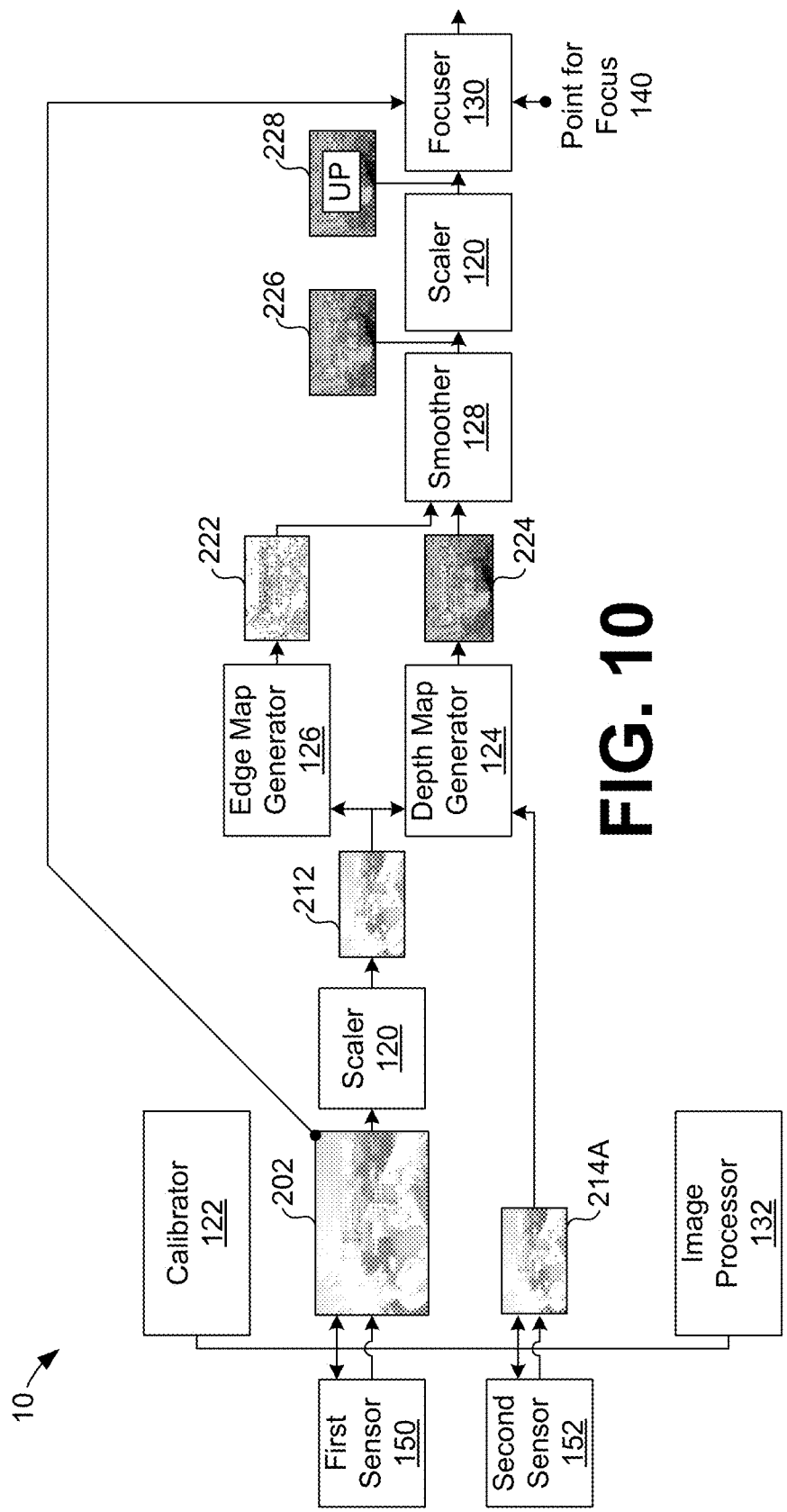
FIG. 10 illustrates an alternative process flow for depth map generation and post-capture focusing elements of the system of FIG. 1A according to an example embodiment.

FIG. 10 illustrates an alternative process flow for depth map generation and post-capture focusing elements of the system 10 of FIG. 1A according to an example embodiment. The alternative process flow illustrated in FIG. 10 is similar to that of FIG. 2, although the sensor 152 generates a second image 214A, which is of lower pixel density than the second image 204 of FIG. 2, and the scaler 120 is not relied upon to downscale the second image 214A. In this case, the second sensor 152 captures and generates the second image 214A at a pixel density which is lower as compared to the density of the first image 202. As such, it is not necessary to downscale the pixel density of the second image 214A before it is compared with the downscaled first image 212 by the depth map generator 124.

Here, it is noted that the first and second sensors 150 and 152 may be of different pixel density and/or type. For example, the second sensor 152 may be a lower cost and/or lower resolution sensor, as compared to the first sensor 150. Further, the second sensor 152 may be embodied as a luminance only sensor, for example, or other sensor of relatively limited range of capture. In this case, the image processor 132 may forward only the luminance data from the first image 202, and the edge map generator 126 and the depth map generator 124 may compare luminance data values when generating the edge map 222 and the depth map 224. In this case, although the depth map 224 may be representative of relative depth values based on luminance data, the focuser 130 may still blend and/or point spread color pixels of the first image 202. That is, is should be appreciated that the relative depth values in the depth map 224 are generally agnostic to any color or types of color for the generation of selectively focused output images.

Figure 11:
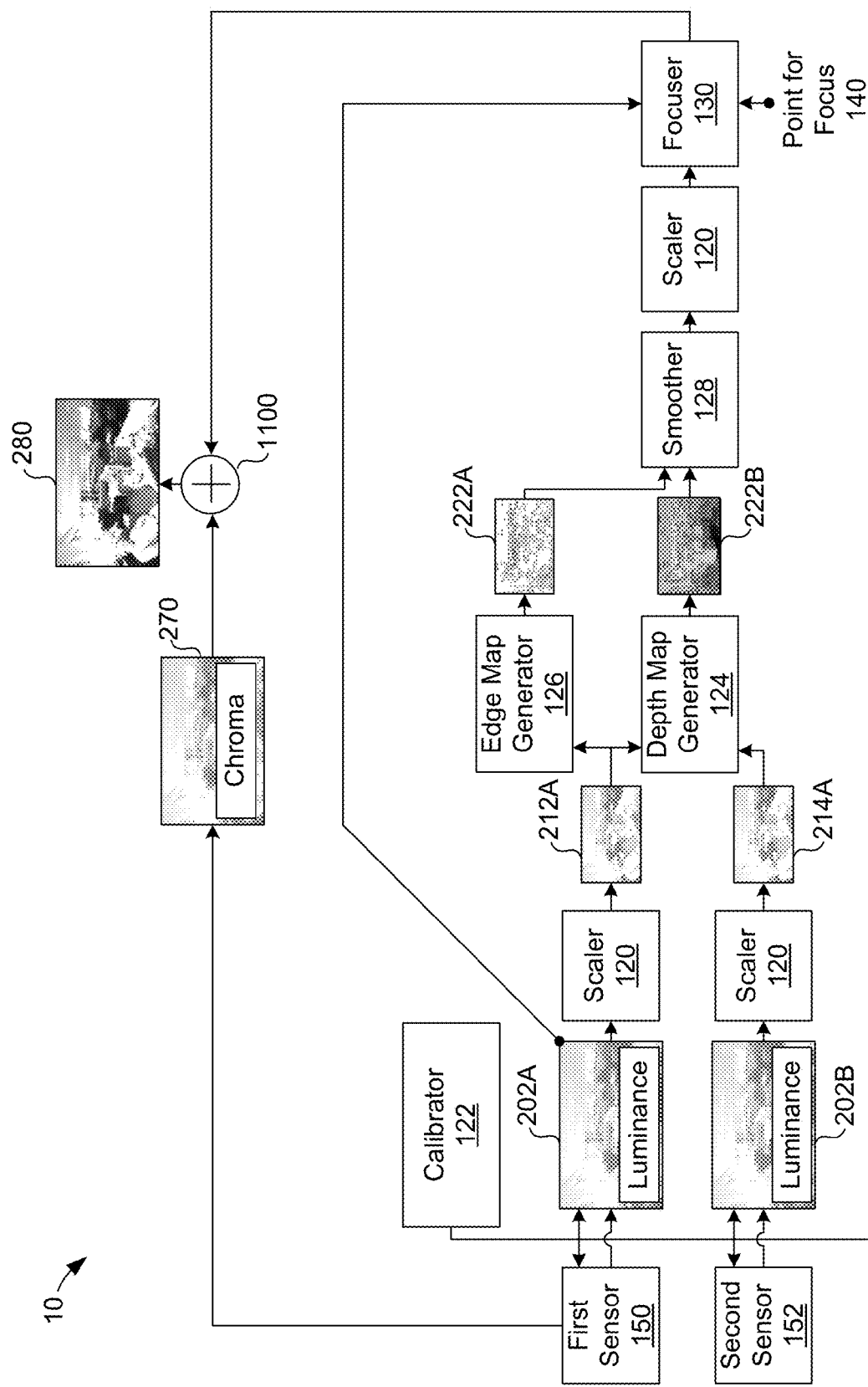
FIG. 11 illustrates a luminance and chrominance process flow for depth map generation and post-capture focusing the system of FIG. 1A according to an example embodiment.

FIG. 11 illustrates another alternative process flow for depth map generation and post-capture focusing elements of the system 10 of FIG. 1A according to an example embodiment. The alternative process flow illustrated in FIG. 11 is similar to that of FIG. 2, although the scaler 120, the edge map generator 126, the depth map generator 124, the smoother 128, and the focuser 130 operate on luminance components of any images captured by the first and second sensors 152. In other words, rather than processing both chroma and luminance image data, for example, the scaler 120, the edge map generator 126, the depth map generator 124, the smoother 128, and the focuser 130 may process luminance data components only. In this way, processing requirements may be reduced, as relatively less image data is processed.

In the process flow of FIG. 11, the output of the focuser 130 is provided to the summer 1100, and the summer 1100 sums the output of the focuser 130 with chroma image data 270 from the first sensor 150, to generate the output image 280. Here, the summer 1100 may add the chroma image data 270 to the output of the focuser 130. In this context, the output of the focuser 130 includes luminance image data which has been selectively focused, and the summer 1100 adds the chroma (i.e., color) image data 270 to the luminance image data, to provide the output image 280. With the process flows illustrated in FIGS. 2, 10, and 11 provided by way of example, it should be appreciated that the system 10 may operate according to other process flows within the scope and spirit of the embodiments described herein.

Figure 12:
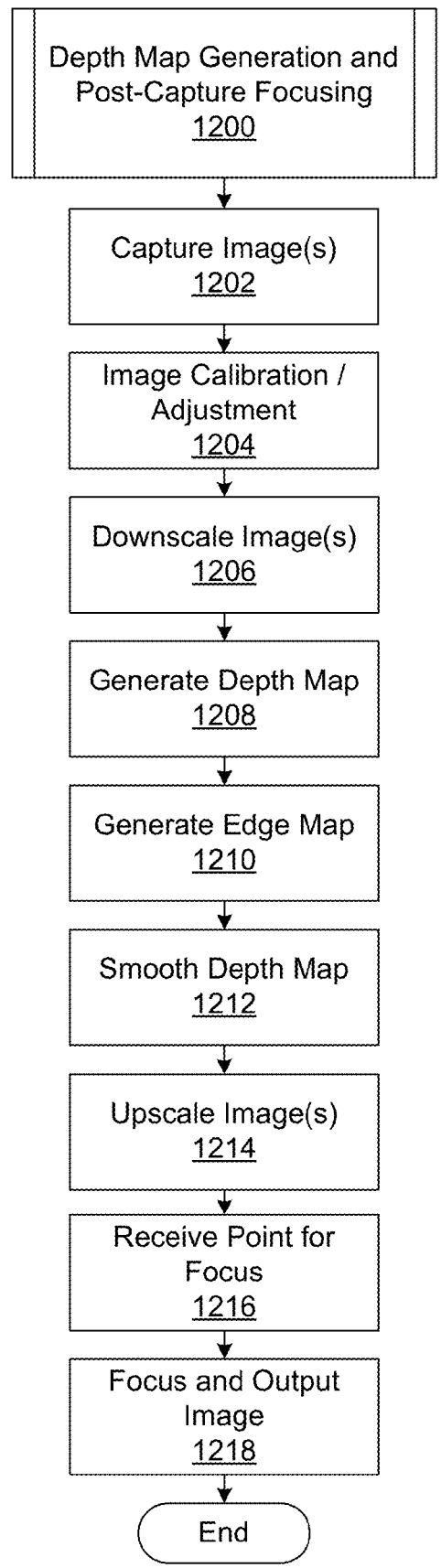
FIG. 12 illustrates a flow diagram for a process of depth map generation and post-capture focusing performed by the system of FIG. 1A according to an example embodiment.

Before turning to the process flow diagrams of FIG. 12, it is noted that the embodiments described herein may be practiced using an alternative order of the steps illustrated in FIG. 12. That is, the process flows illustrated in FIG. 12 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments. Finally, although the process 1200 of FIG. 12 is generally described in connection with the system 10 of FIG. 1A and/or the device 160 of FIG. 1B, the process 1200 may be performed by other systems and/or devices.

FIG. 12 illustrates a flow diagram for a process 1200 of depth map generation and post-capture focusing performed by the system 10 of FIG. 1A according to an example embodiment. At reference numeral 1202, the process 1200 includes capturing one or more images. In one embodiment, at reference numeral 1202, the process 1200 includes capturing a first image and a second image. In one embodiment, the pixel densities of the first and second images are similar. In other embodiments, a pixel density of the second image is a scalar fraction of the pixel density of the first image.

With reference to FIG. 2, the first and second sensors 150 and 152 may capture the first and second images 202 and 204 at reference numeral 1202. Here, it is noted that the images captured at reference numeral 1202 may be captured by any suitable sensors or heterogeneous mix of image sensors. For example, a combination of color and luminance image sensors may be relied upon, for example.

At reference numeral 1204, the process 1200 includes calibrating or adjusting one or more sensors used to capture images or images captured by the one or more sensors. For example, one or more of the sensors 150 and 152 may be calibrated or adjusted, and/or one or more of the images 202 or 204 may be calibrated or adjusted.

At reference numeral 1206, the process 1200 includes downscaling one or more of the images captured at reference numeral 1202. For example, at reference numeral 1206, the process 1200 may include downscaling the first image captured at reference numeral 1202 to a downscaled first image. In this case, if the pixel density of the second image captured at reference numeral 1202 was a scalar fraction of the pixel density of the first image capture at reference numeral 1202, a pixel density of the downscaled first image may be substantially equivalent to the pixel density of the second image. In certain embodiments of the process 1200, the downscaling at reference numeral 1206 may be relied upon to bring the images captured at reference numeral 1202 into a range of similar pixel density. In some embodiments, the downscaling at reference numeral 1206 may be omitted, for example, if the images captured at reference numeral 1202 are of a similar and suitable pixel density. With reference to elements of the system 10 and FIG. 2, the downscaling at reference numeral 1206 may be performed by the scaler 120.

At reference numeral 1208, the process 1200 includes generating a depth map including a mapping among relative depth values in a field of view, based on a difference between pixels of a first image and pixels of a second image. For example, with reference to elements of the system 10 and FIG. 2, the depth map generator 124 may generate the depth map 224 based on the downscaled first and second images 212 and 214. Alternatively, if downscaling is not relied upon, the depth map generator 124 may generate a depth map based on the first and second images 202 and 204.

At reference numeral 1210, the process 1200 includes generating an edge map identifying edges in at least one of the images captured at reference numeral 1202 and/or downscaled at reference numeral 1206. For example, with reference to elements of the system 10 and FIG. 2, the edge map generator 126 may generate the edge map 222 based on one or more of the downscaled first or second images 212 or 214, according to any of the techniques for the generation of depth maps described herein. Alternatively, if downscaling is not relied upon, the depth map generator 124 may generate a depth map based on one or more of the first or second images 202 or 204.

At reference numeral 1212, the process 1200 includes smoothing the relative depth values of the depth map generated at reference numeral 1208 using the edge map generated at reference numeral 1210, and providing a smooth depth map. For example, with reference to FIG. 2, the smoother 128 may smooth the relative depth values of the depth map 224 using the edge map 222, according to any of the techniques for smoothing described herein.

At reference numeral 1214, the process 1200 includes upscaling the smoothed depth map generated at reference numeral 1212. With reference to FIG. 2, the upscaling at reference numeral 1214 may be performed by the scaler 120. In some embodiments, for example, if the downscaling at reference numeral 1206 is amended from the process 1200, the upscaling at reference numeral 1214 may also be omitted from the process 1200. Generally, the upscaling at reference numeral 1214 is relied upon to increase the density of depth values in the depth map generated at reference numeral 1208 and smoothed at reference numeral 1212. The relatively higher density of depth values may be relied upon in the focusing at reference numeral 1218.

At reference numeral 1216, the process 1200 includes receiving a point for focus. As discussed above, the system 10 and/or the device 160 may receive a point for focus using any suitable input means, such as by capacitive touch screen, mouse, keyboard, electronic pen, etc. At reference numeral 1218, the process 1200 includes focusing one or more of the images captured at reference numeral 1202 according to the point for focus received at reference numeral 1216, with reference to the depth values of the smoothed depth map generated at reference numeral 1212. Further, at reference numeral 1218, the process 1200 includes outputting a selectively focused image. For example, with reference to FIG. 9A, the focuser 130 may selectively focus the first image 202 by blending the blurred image 250 with the first image 202, with reference to the relative depth values of the upscaled depth map 228 (or another depth map) and the point for focus 140. Alternatively, with reference to FIG. 9B, the focuser 130 may focus the first image 202 by determining a point spread per pixel for one or more pixels of the first image 202 with reference to the relative depth values of the upscaled depth map 228 (or another depth map) and the point for focus 140.

The process 1200 may be repeated, for example, for various points of focus. In other words, for each point of focus received at reference numeral 1216, the process 1200 may generate a selectively focused output image. Further, it should be appreciated that the process 1200 may be performed using downscaled copies of certain images. That is, the process 1200 may be performed in a manner similar to the process flow illustrated in FIG. 10. Similarly, it should be appreciated that the process 1200 may be performed using certain components of images or image data, such as luminance data, chroma data, or combinations thereof, at various stages in the process flow. In other words, the process 1200 may be performed in a manner similar to the process flow illustrated in FIG. 11.

According to various aspects of the process 1200, the process 1200 may be relied upon for focusing and re-focusing images after they are captured. For example, a luminance image provided by a secondary luminance sensor may relied upon, in connection with a luminance component of an image from a main color image sensor, to generate a depth map representative of relative depth values. The depth map may be used for focusing and re-focusing, for example, or for object extraction, scene understanding, gesture recognition, etc.

Figure 13:
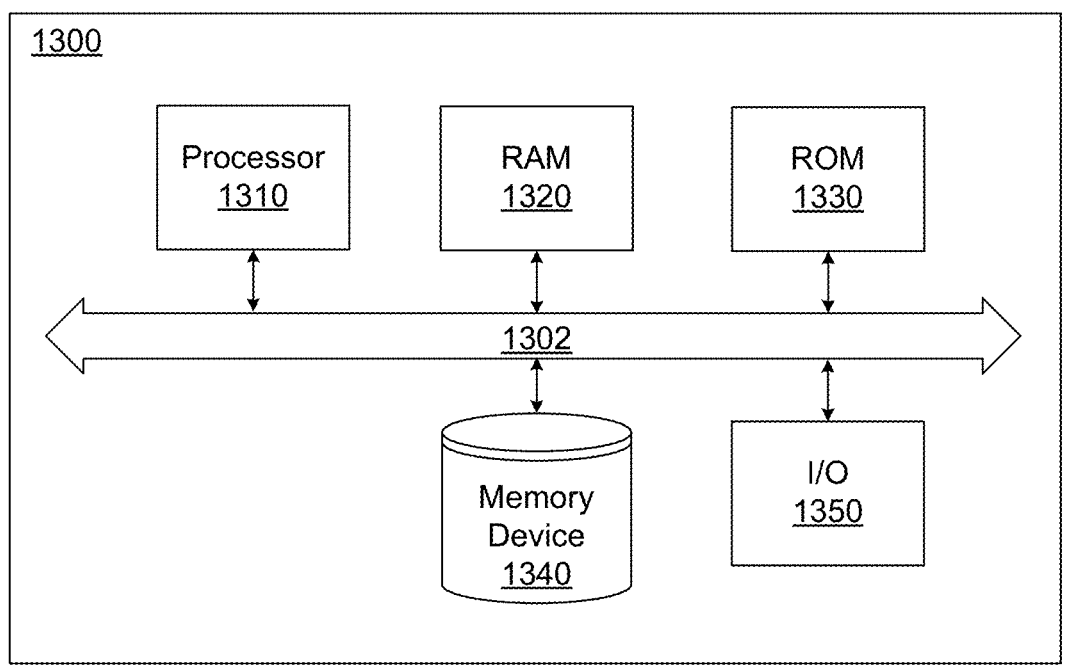
FIG. 13 illustrates an example schematic block diagram of a computing environment which may embody one or more of the system elements of FIG. 1A according to various embodiments.

FIG. 13 illustrates an example schematic block diagram of a computing architecture 1300 that may be employed as the processing environment 100 of the system 10 of FIG. 1A, according to various embodiments described herein. The computing architecture 1300 may be embodied, in part, using one or more elements of a mixed general and/or specific purpose computer. The computing architecture 1300 includes a processor 1310, a Random Access Memory (RAM) 1320, a Read Only Memory (ROM) 1330, a memory device 1340, and an Input Output (I/O) interface 1350. The elements of computing architecture 1300 are communicatively coupled via one or more local interfaces 1302. The elements of the computing architecture 1300 are not intended to be limiting in nature, as the architecture may omit elements or include additional or alternative elements.

In various embodiments, the processor 1310 may include or be embodied as a general purpose arithmetic processor, a state machine, or an ASIC, for example. In various embodiments, the processing environment 100 of FIGS. 1A and 1B may be implemented, at least in part, using a computing architecture 1300 including the processor 1310. The processor 1310 may include one or more circuits, one or more microprocessors, ASICs, dedicated hardware, or any combination thereof. In certain aspects and embodiments, the processor 1310 is configured to execute one or more software modules which may be stored, for example, on the memory device 1340. The software modules may configure the processor 1310 to perform the tasks undertaken by the elements of the computing environment 100 of the system 10 of FIG. 1A, for example. In certain embodiments, the process 1200 described in connection with FIG. 12 may be implemented or executed by the processor 1310 according to instructions stored on the memory device 1340.

The RAM and ROM 1320 and 1330 may include or be embodied as any random access and read only memory devices that store computer-readable instructions to be executed by the processor 1310. The memory device 1340 stores computer-readable instructions thereon that, when executed by the processor 1310, direct the processor 1310 to execute various aspects of the embodiments described herein.

As a non-limiting example group, the memory device 1340 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 1350 includes device input and output interfaces, such as keyboard, pointing device, display, communication, and/or other interfaces. The one or more local interfaces 1302 electrically and communicatively couples the processor 1310, the RAM 1320, the ROM 1330, the memory device 1340, and the I/O interface 1350, so that data and instructions may be communicated among them.

In certain aspects, the processor 1310 is configured to retrieve computer-readable instructions and data stored on the memory device 1340, the RAM 1320, the ROM 1330, and/or other storage means, and copy the computer-readable instructions to the RAM 1320 or the ROM 1330 for execution, for example. The processor 1310 is further configured to execute the computer-readable instructions to implement various aspects and features of the embodiments described herein. For example, the processor 1310 may be adapted or configured to execute the process 1200 described above in connection with FIG. 12. In embodiments where the processor 1310 includes a state machine or ASIC, the processor 1310 may include internal memory and registers for maintenance of data being processed.

The flowchart or process diagram of FIG. 12 is representative of certain processes, functionality, and operations of embodiments described herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 1310. The machine code may be converted from the source code, etc. Further, each block may represent, or be connected with, a circuit or a number of interconnected circuits to implement a certain logical function or process step.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. An image processing method, comprising:
   generating, with a processing circuit, a depth map including a mapping among relative depth values in a field of view based on a difference between pixels of a first image and pixels of a second image;
   generating, with the processing circuit, an edge map identifying edges in at least one of the first image or the second image; and
   smoothing, with the processing circuit, the relative depth values of the depth map based at least in part on a linear fit of the relative depth values between the edges identified by the edge map.

2. The method of claim 1, further comprising:
   capturing the first image and the second image, a pixel density of the second image being a scalar fraction of the pixel density of the first image; and
   before generating the edge map, downscaling the first image to a downscaled first image, a pixel density of the downscaled first image being substantially equivalent to the pixel density of the second image.

3. The method of claim 1, further comprising:
   receiving a point for focus within the field of view; and
   focusing the first image according to the point for focus with reference to the relative depth values of the depth map.

4. The method of claim 3, wherein focusing the first image comprises determining a point spread per pixel for one or more pixels of the first image with reference to the relative depth values of the depth map and the point for focus.

5. The method of claim 3, wherein focusing the first image comprises:
   generating a blurred replica of the first image; and
   blending the blurred replica of the first image with the first image according to the relative depth values of the depth map and the point for focus.

6. The method of claim 3, wherein focusing the first image comprises focus stacking regions of the first image with regions of a plurality of images having different focus points or depths of field with reference to the relative depth values of the depth map.

7. The method of claim 1, comprising:
   capturing the first image with a first sensor; and
   capturing the second image with a second sensor while capturing the first image with the first sensor.

8. The method of claim 1, wherein smoothing the relative depth values of the depth map comprises:
filtering the relative depth values in a column of the depth map between a first pair of edges in the edge map; and
filtering the relative depth values in a row of the depth map between a second pair edges in the edge map.

9. The method of claim 1, wherein smoothing the relative depth values of the depth map further comprises iteratively filtering, in rows and columns, depth values of the depth map between pairs of edges in the edge map.

10. An image processing device,
comprising: at least one sensor;
a memory coupled to the at least one sensor; and
a processing circuit coupled to the memory and configured to:
generate a depth map including a mapping among relative depth values in a field of view of at least one of a first image or a second image;
generate an edge map by identifying edges in at least one of the first image or the second image; and
smooth the relative depth values of the depth map based at least in part on a linear fit of the relative depth values between the edges identified by the edge map.

11. The image processing device of claim 10, wherein the processing circuit is further configured to generate the depth map based on a difference between pixels of the first image and pixels of the second image.

12. The image processing device of claim 10, wherein:
the at least one sensor captures the first image and the second image; and
the processing circuit is further configured to downscale at least one of the first image or the second image before the depth map and the edge map are generated.

13. The image processing device of claim 10, wherein the processing circuit is further configured to:
receive a point for focus within a field of view of the first image or the second image; and
focus the first image according to the point for focus with reference to the relative depth values of the depth map.

14. The image processing device of claim 13, wherein the processing circuit is further configured to determine a point spread per pixel for one or more pixels of the first image with reference to the relative depth values of the depth map and the point for focus.

15. The image processing device of claim 13, wherein the processing circuit is further configured to:
generate a blurred replica of the first image; and
blend the blurred replica of the first image with the first image according to the relative depth values of the depth map and the point for focus.

16. The image processing device of claim 13, wherein the processing circuit is further configured to focus stack regions of the first image with regions of a plurality of images having different focus points or depths of field with reference to the relative depth values of the depth map.

17. The image processing device of claim 10, wherein the at least one sensor comprises a first sensor that captures the first image, and a second sensor that captures the second image while the first image is captured with the first sensor.

18. A computer program product comprising instructions stored in a non-transitory computer-readable storage medium, the instructions comprising:
instructions to capture a first image and a second image using a mix of image sensors;
instructions to generate a depth map including a mapping among relative depth values based on a difference between pixels of the first image and pixels of the second image;
instructions to generate an edge map by identifying edges in at least one of the first image or the second image; and
instructions to smooth, the relative depth values of the depth map based at least in part on a linear fit of the relative depth values between the edges identified by the edge map.

19. The computer program product of claim 18, wherein the instructions further comprise:
instructions to receive a point for focus; and
instructions to focus the first image according to the point for focus with reference to the relative depth values of the depth map.

20. The computer program product of claim 19, wherein the instructions to focus the first image comprises:
instructions to generate a blurred replica of the first image; and
instructions to blend the blurred replica of the first image with the first image according to the relative depth values of the depth map and the point for focus.

* * * * *